United States Patent
Parvathala et al.

(10) Patent No.: US 6,928,638 B2
(45) Date of Patent: Aug. 9, 2005

(54) TOOL FOR GENERATING A RE-GENERATIVE FUNCTIONAL TEST

(75) Inventors: Praveen K. Parvathala, Phoenix, AZ (US); Kailasnath Maneparambil, Chandler, AZ (US); William C. Lindsay, Chandler, AZ (US); Kamalnayan Jayaraman, Chandler, AZ (US); Geliang Zhou, Santa Cara, CA (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 09/922,639

(22) Filed: Aug. 7, 2001

(65) Prior Publication Data

US 2003/0033558 A1 Feb. 13, 2003

(51) Int. Cl.⁷ .................................................. G06F 9/44
(52) U.S. Cl. ...................... 717/124; 717/126; 714/25; 714/30; 714/733; 714/761
(58) Field of Search ................................. 717/124, 126; 716/1, 4; 714/733, 25, 30, 761, 819, 719, 28, 43, 33, 734; 712/227

(56) References Cited

U.S. PATENT DOCUMENTS

| | | | | |
|---|---|---|---|---|
| 4,622,669 A | * | 11/1986 | Pri-Tal | 714/43 |
| 5,383,195 A | * | 1/1995 | Spence et al. | 714/733 |
| 5,416,783 A | * | 5/1995 | Broseghini et al. | 714/728 |
| 5,475,843 A | * | 12/1995 | Halviatti et al. | 717/124 |
| 5,572,712 A | * | 11/1996 | Jamal | 716/18 |
| 5,761,489 A | * | 6/1998 | Broseghini et al. | 712/227 |
| 6,091,649 A | * | 7/2000 | Choi | 365/200 |
| 6,327,556 B1 | * | 12/2001 | Geiger et al. | 703/13 |
| 6,400,173 B1 | * | 6/2002 | Shimizu et al. | 324/765 |
| 6,415,403 B1 | * | 7/2002 | Huang et al. | 714/726 |
| 6,553,527 B1 | * | 4/2003 | Shephard, III | 714/733 |
| 6,658,611 B1 | * | 12/2003 | Jun | 714/719 |
| 6,698,012 B1 | * | 2/2004 | Kossatchev et al. | 717/126 |
| 6,708,305 B1 | * | 3/2004 | Farnsworth et al. | 714/739 |
| 6,728,901 B1 | * | 4/2004 | Rajski et al. | 714/30 |
| 6,732,297 B2 | * | 5/2004 | Oura | 714/33 |
| 6,760,888 B2 | * | 7/2004 | Killian et al. | 716/1 |
| 6,769,081 B1 | * | 7/2004 | Parulkar | 714/733 |
| 6,769,115 B1 | * | 7/2004 | Oldman | 717/126 |

OTHER PUBLICATIONS

TITLE: BIFEST: A Built–in Intermediate Fault effect sensing and test generation system for CMOS Bridging faults, author: Lee et al, ACM, Apr., 1999.*
TITLE: Built–in Self–Test with an alternating Output, author: Bogue et al, IEEE, 1998.*
TITLE: Built–In Test Sequence Generation for Synchronous Sequential Circuits Based on Loading and Expansion of Test Subsequences, author: Pomeranz et al, ACM, 1999.*
TITLE: Concurrent Test Scheduling in Built–In Self–Test environment, author: Chen et al, IEEE, 1992.*
TITLE: Testing Pointing Device Performance and User Assessment with the ISO 9241, Part 9 Standard, author: Douglas et al, ACM, 1999.*

* cited by examiner

Primary Examiner—Chameli C. Das
(74) Attorney, Agent, or Firm—Schwegman, Lundberg, Woessner & Kluth, P.A.

(57) ABSTRACT

A host system for generating a software built-in self-test engine (SBE) is provided for enabling on-chip generation and application of a re-generative functional test on a complex device such as a microprocessor under test. The host system comprises user directives provided to indicate user desired actions; instruction information provided to define a suite of instructions; and a SBE generation tool arranged to generate a software built-in self-test engine (SBE) based on the user directives, the instruction information and device constraints, for subsequent storage on-board of a complex device such as a microprocessor under test and activation of a re-generative functional test on the complex device under test (DUT).

31 Claims, 11 Drawing Sheets

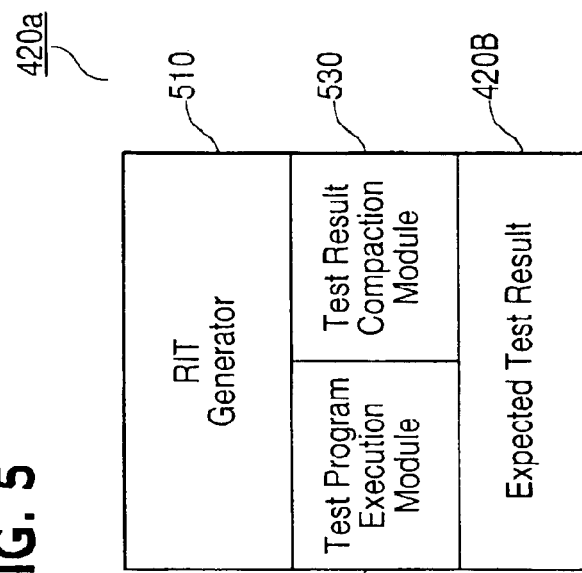
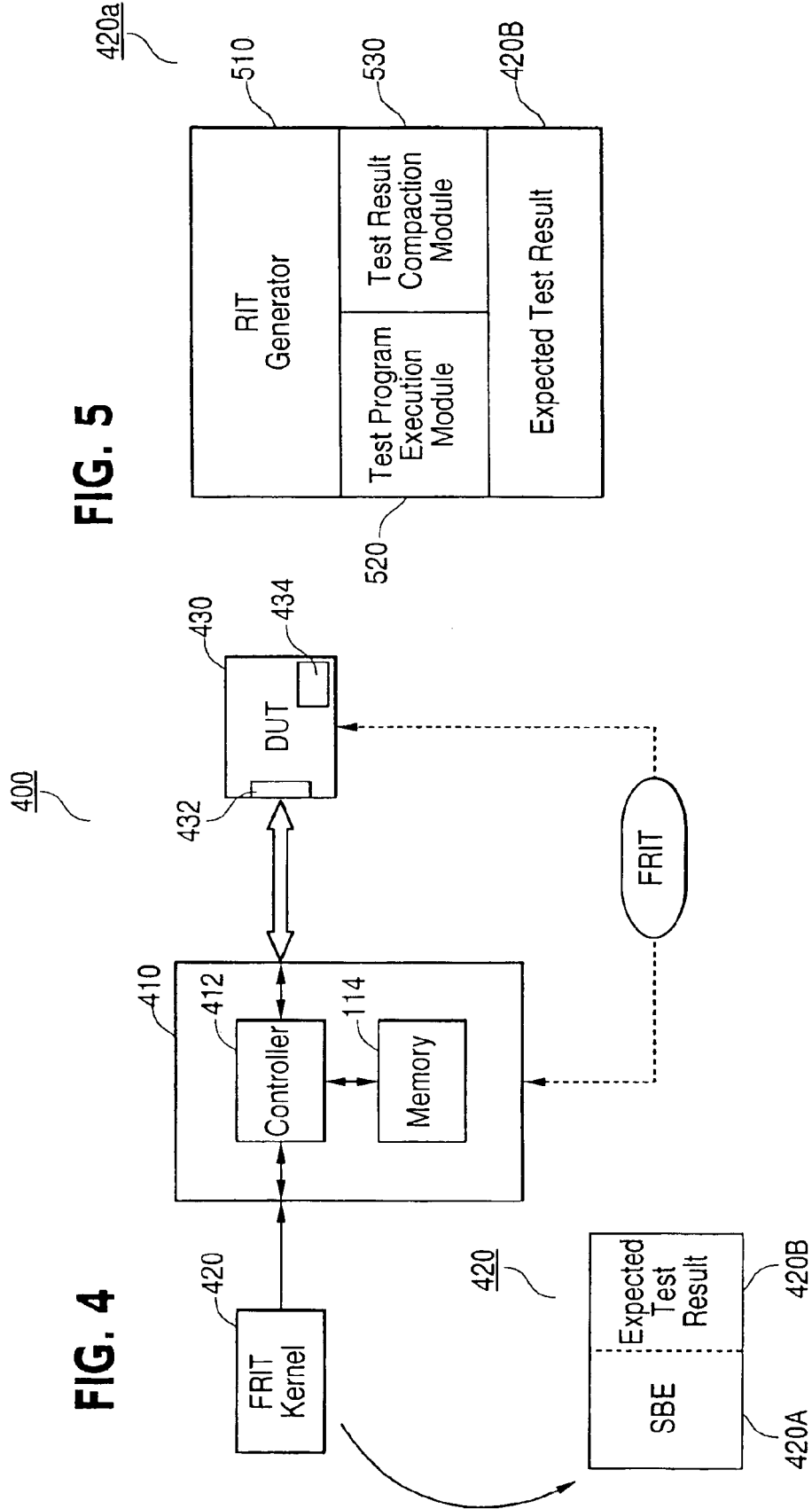

TOOL FOR GENERATING A RE-GENERATIVE FUNCTIONAL TEST

CROSS-REFERENCE TO RELATED APPLICATION

This application relates to prior application for Functional Random Instruction Testing (FRIT) Method For Complex Devices Such As Microprocessors filed on Jul. 31, 2001, there duly assigned Ser. No. 09/917,661.

TECHNICAL FIELD

The present invention relates to the manufacture and functional testing of complex devices such as microprocessors, and more particularly, relates to a tool for generating a re-generative functional test in the form of a kernel for enabling on-chip generation and application of functional tests.

BACKGROUND

Application specific integrated circuit (ASIC) technology has undergone rapid changes in recent years. Current ASIC chips may include functional blocks, such as microprocessors, interfaces, memory arrays, and DSPs (digital signal processors) all of which need to be validated for design correctness and/or tested for manufacturing defects.

Microprocessor testing is typically considered one of the most complex problems in ASIC testing, whether the microprocessor happens to be an ASIC core or a stand-alone device. This is because modern microprocessors are highly complex and typically enhanced with additional operating modes and features. For example, newer x86 microprocessors such as Pentium® processors as marketed by Intel® Corporation are designed to maintain software compatibility with previous 80x86 microprocessor generations (e.g., 8086/8, 80286, 80386, and 80486). These newer x86 microprocessors include multiple operating modes and are equipped with cache memory systems and added hardware support features for operation in multi-processor environments. Errors in the designs of microprocessors and defects introduced during manufacturing may cause the microprocessors to produce incorrect results during operation.

Traditionally functional tests have been used to ensure that complex devices such as microprocessors under test produce correct results in all possible operating environments. Functional tests may be manually written by designers/programmers but are typically generated by random instruction test (RIT) tools, via a host computer under an operating system (OS) as described, for example, in the "Native Mode Functional Test Generation For Processors With Applications To Self Test and Design Validation" by Jian Shen and Jacob A. Abraham of the Computer Engineering Research Center, University of Texas, IEEE International Test Conference, pp. 990–999, August 1998. In general, these functional tests include software instructions which cause a microprocessor under test to perform a desired activity and to produce a test result. The test result is compared with an expected test result derived from a functional specification of the microprocessor under test. Any difference between the test result produced by the microprocessor under test and the expected test result represents a failure of the functional test. Such a functional test failure may indicate improper microprocessor operation due to a design error or a manufacturing defect.

However, manual development of functional tests is very costly in terms of the (human) resources needed. Likewise, RIT tools are not very efficient in terms of high fault coverage and, often, require a large number of tests and a large tester memory to produce high coverage. In addition, large scale, high pin count and expensive automatic test equipments (ATE) such as IC testers with several hundreds test pins (test channels), each of which includes a pattern generator, a timing generator and a frame processor, are required.

Other types of testing, such as design-for-test (DFT) techniques and built-in self-test (BIST) schemes such as scan, partial scan, logic BIST, and scan-based BIST, have been utilized to structurally test various logic blocks within a microprocessor. However, structural test tools require a large amount of test data and additional hardware area (extra logic circuits) to implement the test logic. In addition, there are inherent problems relating to high performance penalty and low collateral coverage.

Therefore there is need to develop a new tool programmed to generate a re-generative functional test in the form of a kernel that can be loaded on-board of a complex device such as a microprocessor to generate and execute its own functional tests in real time so as to avoid test data volume issues and achieve high collateral coverage with at-speed test application.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIG. 4 illustrates an example test system for testing a complex device such as a microprocessor for manufacturing defects, via an example functional random instruction test (FRIT) kernel according to an embodiment of the present invention;

FIG. 5 illustrates an example functional random instruction test (FRIT) kernel according to an embodiment of the present invention;

DETAILED DESCRIPTION

The present invention is applicable to the testing of microprocessors, complex digital systems, and chipsets and new chipsets having memory and logic components incorporated therein which may become available as computer technology develops in the future. In addition, testing can be conducted on automated test equipment such as low cost testers, functional testers or even computer systems. The present invention is also applicable to the testing of one or more complex devices such as microprocessors integrated on one or more chipsets on board. However, for the sake of simplicity, discussions will concentrate mainly on random instruction testing of a single complex device such as a microprocessor, although the scope of the present invention is not limited thereto.

Figure 1:
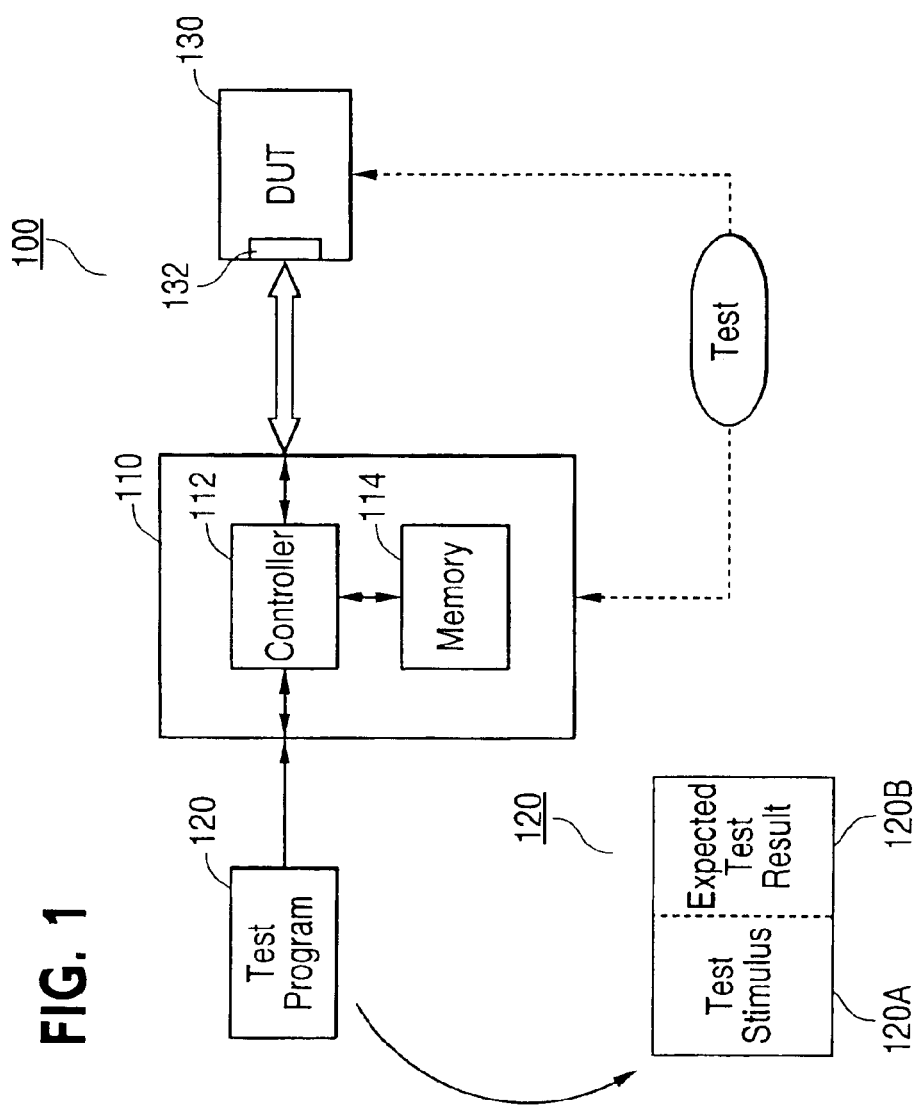
FIG. 1 illustrates an example test system for testing a complex device such as a microprocessor for manufacturing defect(s)

Attention now is directed to the drawings and particularly to FIG. 1, an example test system 100 may include an automated test equipment (ATE) such as a tester 110 utilized for testing a complex device such as a microprocessor under test (DUT) 130, via test programs 120, for manufacturing defect(s). Each test program 120 may include a test stimulus 120A and an expected test result (expected response) 120B. The test stimulus 120 may correspond to a software program, typically written manually or generated by traditional RIT tools for executing a functional test of a complex device such as a microprocessor under test (DUT) 130. The expected test result 120B is an expected response of a complex device under test (DUT) 130 computed based on a computer model of the same complex device under test (DUT) 130.

Generally, a simulation software (simulator) and a simulation model are utilized by a computer system (not shown) for computing the expected response of a complex device under test (DUT) 130. The simulation model may indicate a software representation of a complex device under test (DUT) 130, and may be written using hardware description languages such as Verilog or VHDL, and may be provided on a computer tangible medium, such as memory devices; magnetic disks (fixed, floppy, and removable); other magnetic media such as magnetic tapes; optical media such as CD-ROM disks, or via Internet downloads, which may be available for plug-in or download into an existing operating system (OS) for computing the expected response of a complex device under test (DUT) 130.

As shown in FIG. 1, the tester 110 may include, but not limited to, a controller 112 and a memory 114. The controller 112 may be arranged to receive one or more test programs 120 in tester format and store test patterns into the tester memory 114. The controller 112 may then execute the test program 120 by applying the test patterns to the complex device under test (DUT) 130, via an interface 132, to check for manufacturing defects.

Figure 2:
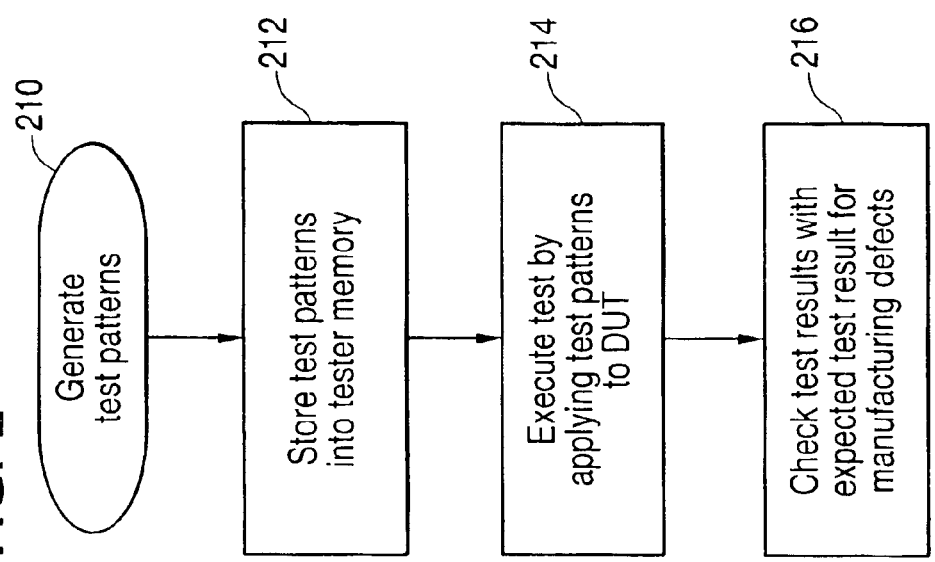
FIG. 2 illustrates an example flow diagram of an example test procedure.

FIG. 2 illustrates an example test procedure of the test system 100 shown in FIG. 1. At block 210, a test program 120 is generated and converted into a tester format (i.e., tester patterns). As described with reference to FIG. 1, the test program 120 includes a test stimulus 120A configured for executing a functional test which tests the functionality of a complex device under test (DUT) 130 or structural test which tests the structure of a complex device under test (DUT) 130, and a test expected result (expected response) 120B computed from the computer modeling of a complex device under test (DUT) 130. The controller 112 of the tester 110 may then store the test patterns in the tester memory 114. Next, the controller 112 of the tester 110 may execute the test program 120 by applying the test patterns stored in the tester memory 114 to the complex device under test (DUT) 130, via the interface 132, at block 214. The controller 112 of the tester 110 may then check the test result from the complex device under test (DUT) 130 with the expected test result (expected response) from the tester memory 114 in order to check for manufacturing defects at block 216.

Test programs 120 configured for functional tests have been commonly used to ensure that complex devices such as microprocessors produce correct results in all possible operating environments and indicate improper microprocessor operation due to design errors or manufacturing defects. However, functional tests are very costly in terms of the (human) resources needed. Traditional RIT tools may be used to generate functional tests, but are not very efficient in terms of high fault coverage and, often, require higher test data volume on a host computer under an operating system (OS).

Figure 3:
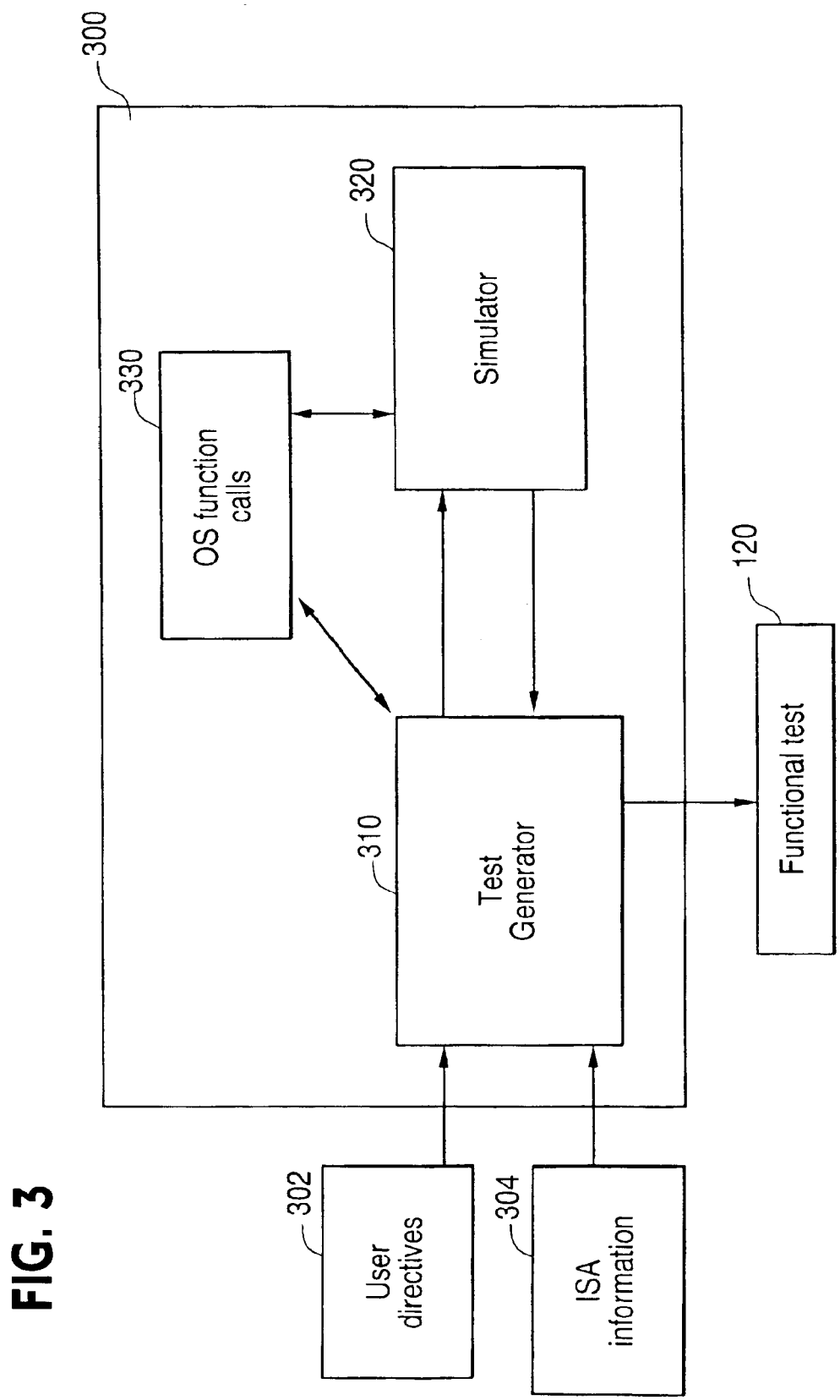
FIG. 3 illustrates an example RIT tool installed in a host computer under an operating system (OS) for generating a test program (functional test)

For example, FIG. 3 illustrates a typical RIT tool provided to generate a test program (functional test) 120. As shown in FIG. 3, the RIT tool 300 may be installed in a host computer under an operating system (OS) to receive user directives (user instructions) 302 and ISA (Instruction Set Architecture) information 304 and generate a test program (functional test) 120. The RIT tool 300 may include a test generator 310 arranged to generate a test program (functional test) 120 under device constraints and other architecture constraints, and a simulator 320 arranged to back-off from illegal instructions such as undefined memory accesses and undefined flags. The simulator 320 may also be utilized to compute the expected response of a complex device under test (DUT) 130. Operating system (OS) function calls 330 are provided from an operating system (OS) to format data, generate random numbers and provide other such services for the test generator 310 and the simulator 320 to generate a test program (functional test) 120. However, RIT tool generated functional tests require high cost tester 110 where the cost is driven by the need for high speed electronics and high pin count. In addition, for high test coverage a large number of such RIT tool generated functional tests are needed which in turn drives up the memory required on the tester 110.

Due to high equipment costs and test generation costs inherent to functional tests, various design-for-test (DFT) techniques and built-in self-test (BIST) schemes such as scan, partial scan, logic BIST, scan-based BIST may be utilized to structurally test various logic blocks within a microprocessor, via low cost tester 110 without the need for high pin count and high speed test. As a result, test programs 120 configured for structural tests have been recently used to indicate improper microprocessor operation due to manufacturing defects. Structural tests may be generated by scan automatic test pattern generation (ATPG) tools and executed in the same manner described with reference to FIG. 2.

The main problem in these structural test approaches is the requirement of large amount of test data and additional hardware area (extra logic circuits) to implement the test logic. This is because test patterns are serially shifted into the microprocessor at slow speeds which can be very costly in terms of test time. In addition, these test schemes also cause a 5–10% performance penalty, typically, in a signal propagation delay. For example, in the scan implementation, each flip-flop circuit in the microprocessor is preceded by a selector (multiplexer) to selectively provide the flip-flop either a scan-in signal or a normal signal. Such an additional selector causes a delay time in the overall performance of the flip-flop circuit. Thus, the design-for-test (DFT) and built-in self-test (BIST) schemes may adversely affect the microprocessor's performance, such as an operating speed because of the signal propagation delays. Moreover, the collateral coverage from application of structural tests may be more limited compared to that achieved through the application of functional patterns.

Turning now to FIG. 4, an example test system 400 for testing a complex device such as a microprocessor for manufacturing defects, via an example functional random instruction test (FRIT) kernel 420 according to an embodiment of the present invention is illustrated. The new functional random instruction test (FRIT) method advantageously enables automated test generation in real time that is functional test based at speed and inexpensive to implement in silicon, and can be applied on low cost structural testers in order to achieve high collateral coverage while avoiding delay defect screening issues. The functional random instruction test (FRIT) method is intended to address the following concerns: (1) the test generation cost issue associated with manual functional test development; (2) the test data volume issue related to RIT tool generated functional tests; (3) the test cost issue by enabling functional tests to be run on low cost structural tests; (4) the test data volume issues on structural testers associated with scan testing; (5) the delay defect screening issues associated with scan testing. Further, since functional patterns are generated and applied at system clock speed, the collateral coverage is very high and, as a result, the defect screening ability of the functional random instruction test (FRIT) method is much superior compared to the structural test methods in use to date. At-speed functional tests can be executed on low cost automated test equipments (ATE) such as low cost testers and delay defects can be identified.

As shown in FIG. 4, the example test system 400 may include a low cost tester 410 utilized for testing a complex device such as a microprocessor under test (DUT) 430, via an especially programmed functional random instruction test (FRIT) kernel 420, for manufacturing defect(s). A FRIT kernel 420 is a software programmed to provide a special re-generative capability. Essentially, the FRIT kernel 420 is a special functional test (sequence of instructions)—a test which generates one or more tests in real time when loaded on-board a complex device such as a microprocessor under test (DUT) 430. When loaded on-board a complex device such as a microprocessor under test (DUT) 430, the FRIT kernel 420 will activate the complex device under test (DUT) 430 to generate and execute its own functional test sequences in real time.

The FRIT kernel 420 may include a software built-in, self-test (BIST) engine (SBE) 420A configured to repeatedly generate and execute functional tests of a complex device under test (DUT) 430, and an expected test result (expected response) 420B computed based on a computer model of the same complex device under test (DUT) 430. Alternatively, the expected test result (expected response) 420B may be incorporated into the software built-in, self-test (BIST) engine (SBE) 420A. In either situation, the SBE 420A of the FRIT kernel 420 may operate independently from any operating system (OS) and may, therefore, provide an environment to store and run the re-generative functional test. The SBE 420A of the FRIT kernel 420 may be written in any computer language such as C or C++ code language, and may be provided on a computer tangible medium, such as memory devices; magnetic disks (fixed, floppy, and removable); other magnetic media such as magnetic tapes; optical media such as CD-ROM disks, or via Internet downloads, which may be available for plug-in or download into the controller 412 of the tester 410 for executing random functional instructions (machine code). In addition, the expected test result (expected response) 420B may be obtained by alternative techniques. For example, one technique to generate the expected response is to run the re-generative functional test on a good device first and then use the test results of a known good device to construct the expected response.

As shown in FIG. 4, the low-cost tester 410 may include, but not limited to, a controller 412 and a memory 414. The complex device under test (DUT) 430 may contain an interface 432 that requires only a few pins, and an on-board memory (e.g., cache) 434 that is used to store the FRIT kernel 420. The controller 412 of the tester 410 may be arranged to receive and store at least a FRIT kernel 420, including the SBE 420A and the test expected result (expected response) 420B into the tester memory 414. The controller 412 may then load the kernel test patterns (SBE) into on-board memory 434 of the complex device under test (DUT) 430, via an interface 432. Once loaded on-board memory 434 of the complex device under test (DUT) 430, the kernel test patterns (SBE) are activated and applied to the complex device under test (DUT) 430. The test result (device response) may be unloaded from the on-board memory 434 of the complex device under test (DUT) 430 and delivered back to the controller 412 of the low-cost tester 410, via an interface 432. The controller 412 of the low-cost tester 410 may then compare the test result from the on-board memory 434 of the complex device under test (DUT) 430 with the test expected result 420B stored in the tester memory 414 in order to check for manufacturing defects. In another embodiment of the present invention, the test result from the complex device under test (DUT) 430 may be sent directly to the tester 410, via the interface 432, without first being stored in the on-board memory 434. At the tester 410, the test result may be compared directly with the test expected result (expected response) 420B for manufacturing defects.

As shown in FIG. 5, the software BIST engine (SBE) 420A of the FRIT kernel 420 contains three (3) components: a compact RIT generator 510, a test program execution module 520, and a test result compaction module 530. The RIT generator 510 is a software configured with compact RIT machine code that can reside in the on-board memory 434 of the complex device under test (DUT) 430 for generating functional test sequences. The test program execution module 520 is a software that contains test execution directives for providing an environment to store and run the re-generated functional test (sequence of instructions). The test execution environment ensures that no memory access outside the complex device under test (DUT) may take place. The test execution environment may also employ an exception handler for handling illegal/dangerous conditions such as undesirable memory accesses, deadlock, shutdown, infinite loops etc. Thus the test execution environment ensures that the complex device under test (DUT) 430 does not generate any bus cycles during test in order to eliminate the need for a high pin count interface to the tester 410. The test result compaction module 530 is a software that compresses test results for storage in the on-board memory 434 of the complex device under test (DUT) 430. Alternatively, the test result compaction module 530 may correspond to a hardware integrated on-board as part of the complex device under test (DUT) 430 for test result compression.

Figure 6:
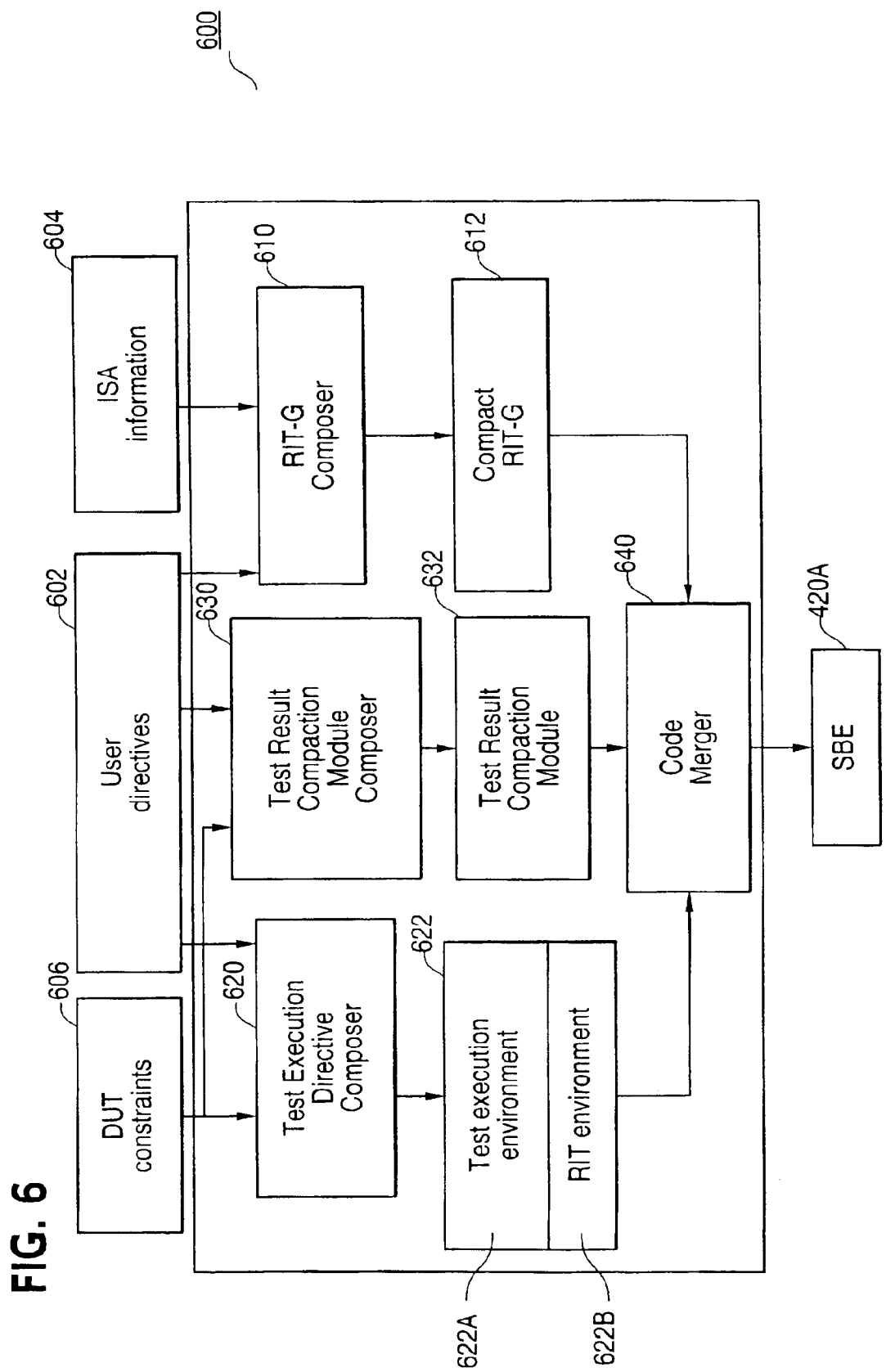
FIG. 6 illustrates an example concept of an example software built-in, self-test (BIST) engine (SBE) generation tool installed in a host computer under an operating system (OS) for generating a SBE of the FRIT kernel according to an embodiment of the present invention.

FIG. 6 illustrates an example concept of an example SBE generation tool installed in a host computer under an operating system (OS) for generating a SBE 420A of the FRIT kernel 420 according to an embodiment of the present invention. Unlike the typical RIT tool 300 used to generate a test program (functional test) 120 as described with reference to FIG. 3, the SBE generation tool 600 according to an embodiment of the present invention is advantageously configured to generate a software BIST engine (SBE) 420A of a FRIT kernel 420 that is used for on-chip generation and application of functional tests. In other words, the SBE 420A of the FRIT kernel 420 is not a typical RIT tool 300 shown in FIG. 3 which requires operating system (OS) facilities for execution. Rather, the SBE 420A of the FRIT kernel 420 is a stand-alone software program used to generate and execute one or more tests (the DUT's own functional test sequences) in real time, when loaded on-board a complex device under test (DUT) 430. This is because the SBE 420A of the FRIT kernel 420 includes a compact RIT generator 510 loaded onboard a complex device under test (DUT) 430 such that a target complex device under test (DUT) 430 can be made to generate its own test in real time. In addition, the SBE 420A of the FRIT kernel 420 does not require OS support for test generation since the operating system (OS) is non-existent on the target complex device under test (DUT) 430. Instead, a run time (test execution) environment 622 may be provided for the equivalent OS functionality in order to store and execute its own functional test sequences. This way a large number of tests can be executed without corresponding increase in test vector and other test generation restrictions. Likewise, the entire testing can be made possible on low pin count testers because real time generation and application of tests are enabled by the SBE 420A of the FRIT kernel 420 while on-board a target complex device under test (DUT) 430.

As shown in FIG. 6, the SBE generation tool 600 may include a RIT-generator (RIT-G) composer 610, a test execution directive composer 620, a test result compaction module composer 630, and a code merger 640. The RIT-G composer 610 may be arranged to receive user directives 602 and ISA information 604 and generate a compact RIT-generator (RIT-G) code 612. The test execution directive composer 620 may be arranged to receive the user directives 602 and DUT constraints 606 and provide a run time environment 622. The run time environment 622 may include an environment for the generated tests, called "test execution environment" 622A to provide memory protection and an exception handler to handle occurrence of illegal conditions on-chip such as undesirable memory accesses, deadlock, shut-down, an infinite loops etc., and an environment 622B for the compact RIT-G code 612. The test result compaction module composer 630 may be arranged to generate a test result compaction module code 632 used to compress test results for subsequent storage on-board a complex device under test (DUT) 430. The code merger 640 may merge coding from the RIT-G composer 610, the test execution directive composer 620 and the test result compaction module composer 630 to produce the SBE 420A of the FRIT kernel 420 as shown in FIG. 4.

Individual module of the SBE generation tool 600 shown in FIG. 6, such as the RIT-G composer 610, the test execution directive composer 620, the test result compaction module composer 630, may be written in any computer language such as C or C++ code language. The SBE generation tool 600 may be provided on a computer tangible medium, such as memory devices; magnetic disks (fixed, floppy, and removable); other magnetic media such as magnetic tapes; optical media such as CD-ROM disks, or via Internet downloads, which may be available for plug-in or download into the host computer for generating a SBE 420A of a FRIT kernel 420. Alternatively, the SBE generation tool 600 shown in FIG. 6 may be implemented, via hardware of a host computer, to generate a SBE 420A of a FRIT kernel 420.

Figure 7:
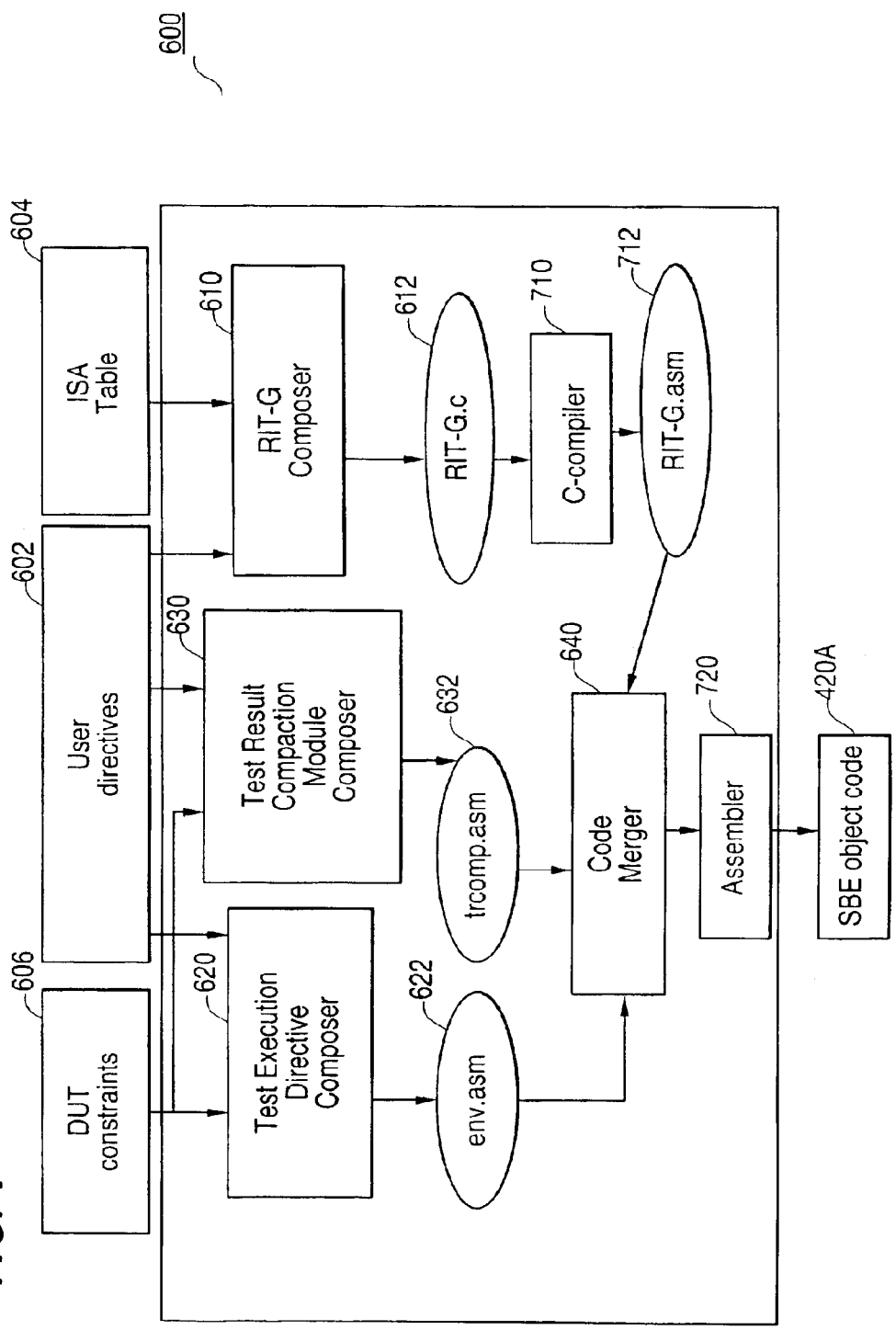
FIG. 7 illustrates an example SBE generation tool implementation according to an embodiment of the present invention.

FIG. 7 illustrates an example SBE generation tool implementation according to an embodiment of the present invention. As shown in FIG. 7, the test execution directive composer 620 may be a component of the SBE generation tool 600 that is responsible for generating run time environments (env.asm), i.e., the test execution environment 622A and the RIT environment 622B, which are needed to ensure a regenerative functional test SBE 420A of a FRIT kernel 420 to repeatedly generate functional tests and execute the generated tests in real time on a target complex device under test (DUT) 430. The test execution environment 622 may be dependent on the memory available in the complex device under test (DUT) 430, and such information may be provided to the SBE generation tool 600 as DUT constraints 606.

During test application, the SBE 420A of the FRIT kernel 420 enables generation and execution of multiple functional tests. Each functional test may include a sequence of random instructions. The number of instructions in each functional test and the number of functional tests that need to be generated may be user controlled and are part of the user directives 602. Based on these user directives 602, a test execution environment 622A may be produced by the test execution directive composer 620 which ensures appropriate testing is accomplished. In addition, the test execution environment 622A may also include an exception handler to handle illegal conditions, such as illegal memory accesses, infinite loops etc., that occur during test execution. The RIT environment 622B has the basic environment that accomplishes operating system (OS) functions needed by the RIT generator 612.

The test result compaction module composer 630 generates the test result compaction module code (trcomp.asm) 632 that is used by the target complex device under test (DUT) 430 in order to compress the test results obtained by application of the several functional tests that get generated and executed during testing.

The RIT-G composer 610 may be a complex piece of software that is responsible for producing compact RIT-G programs based on user directives 602. The target RIT generator 612 has several constraints that must be followed. For a target complex device under test (DUT) 430, the ISA (instruction set architecture) information 604 defines the entire suite of possible instructions that a RIT generator 612 can potentially use. However based on the user directives 602, specific instruction sequences may only be produced by any particular RIT generator 612. Examples of such user directives 602 include, but are not limited to the following cases: Specifying a class of instructions like floating point, integer, branch, etc., specifying sequences of instruction classes like memory operations followed by integer/floating point instructions, specifying a ratio of the desired mix of the instruction classes etc.

The RIT-G composer 610 may be capable of taking such user directives and crafting specific RIT-G programs that when executed by the complex device under test (DUT) 430 in real time during test application, produce functional tests in accordance with the user directives 602 provided. The RIT-G code (RIT-G.c) 612 is a program (sequence of target DUT instructions) that meets the following constraints: it is compact in memory utilization, efficient in terms of instruction generation cost, is able to work around the lack of an operating system (OS) by using the provided run time environment 622, and when executed on the target DUT 430 during test, generates sequences of DUT instructions. The RIT-G code 612 includes an instruction generation module. The algorithm of the instruction generation module is shown in FIG. 8.

In the example SBE tool implementation shown in FIG. 7, the RIT generator (RIT-G) 612 produced is a C-language program which is compiled by a C-compiler 710 to produce the assembly language version of the RIT generator (RIT-G.asm) 712. Once the run time test execution environment 622, the test result compaction module 632 and the assembly language version of the RIT generator (RIT-G.asm) 712 are generated, the code merger 640 is used to generate a single assembly language program. This is processed by the assembler 720 to produce the final re-generative functional test SBE 420A in the object code (machine language) of the target complex device under test (DUT) 430.

Figure 8:
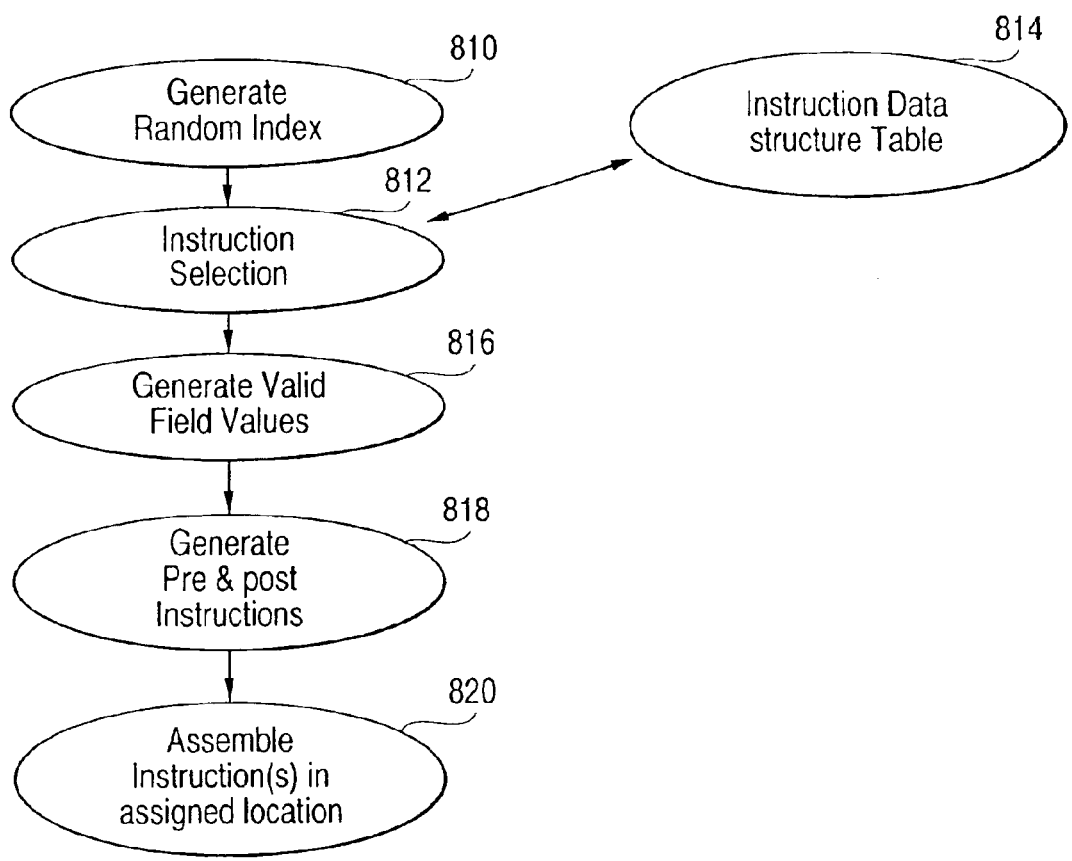
FIG. 8 illustrates an example instruction generation algorithm embedded in the SBE for generating an individual instruction during test application according to an embodiment of the present invention.

FIG. 8 illustrates an example instruction generation algorithm that is part of the RIT generator 612 according to an embodiment of the present invention. The algorithm shows how an individual instruction gets generated by the RIT generator 612 when it is executed as part of the SBE 420A by the complex device under test (DUT) 430. At block 810, a random index may be first generated. At block 812, the random index may then be used to select an instruction to be generated from the instruction data structure table 814. Each instruction may include several fields. For the selected instruction, the valid field values may be generated at block 816. Certain instructions may not be self-contained and may need additional instructions to be executed before or after the generated instruction.

At block 818, all such instructions may be handled, and appropriate pre and post instructions may be generated. At block 820, the generated instruction may then be stored in the on-board memory of the target complex device under test (DUT) 430 at the location assigned by the test execution environment 622.

Figure 9:
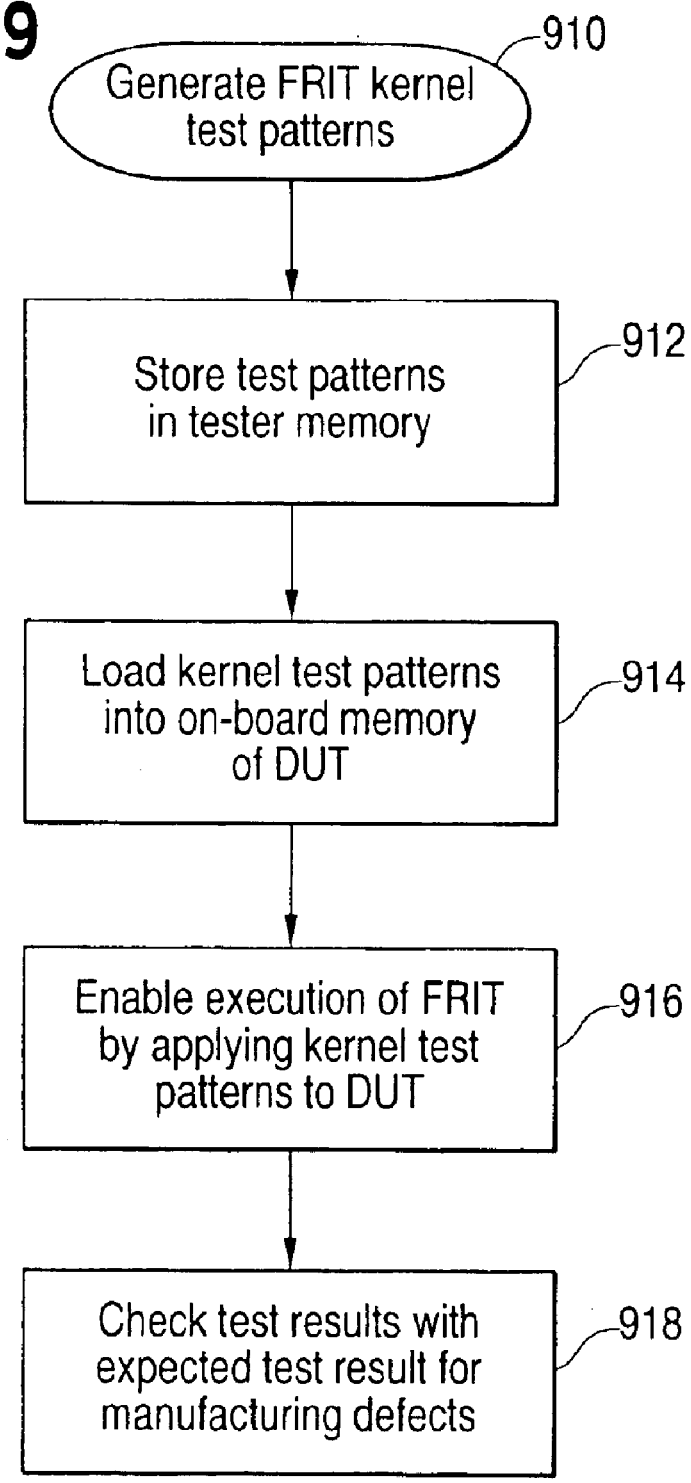
FIG. 9 illustrates a flow diagram of an example functional random instruction test (FRIT) application according to an embodiment of the present invention.

Referring now to FIG. 9, an example test procedure of the test system 400 according to an embodiment of the present invention is illustrated. At block 910, the FRIT kernel 420 is generated and converted into a test format (i.e., kernel test patterns). As described with reference to FIG. 4, the FRIT kernel 420 contains a SBE 420A configured for executing the functional test sequences which test the functionality of a complex device under test (DUT) 430, and a test expected result (expected response) 420B computed from the computer modeling of the same complex device under test (DUT) 430 or from a known good device.

The controller 412 of the low-cost tester 410 may then receive and store the kernel test patterns in the tester memory 414 at block 912. Next, the controller 412 of the low cost tester 410 may then load the kernel test patterns (SBE "420A") into on-board memory 434 of the complex device under test (DUT) 430, via an interface 432 at block 914. Once loaded into the on-board memory 434 of the complex device under test (DUT) 430, the controller 412 of the low cost tester 410 may enable execution of the kernel test patterns (SBE "420A"), that is, the kernel test patterns (SBE "420A") may be automatically activated and repeatedly applied to the complex device under test (DUT) 430 at block 916. The test results may store in the on-board memory 434 of the complex device under test (DUT) 430. The controller 412 of the tester 410 may then unload the test results (device response) from the on-board memory 434 of the complex device under test (DUT) 430, via the interface 432, and compare the test results from the on-board memory 434 of the complex device under test (DUT) 430 with the test expected result 420B stored in the tester memory 414 in order to check for manufacturing defects at block 918.

Figure 10:
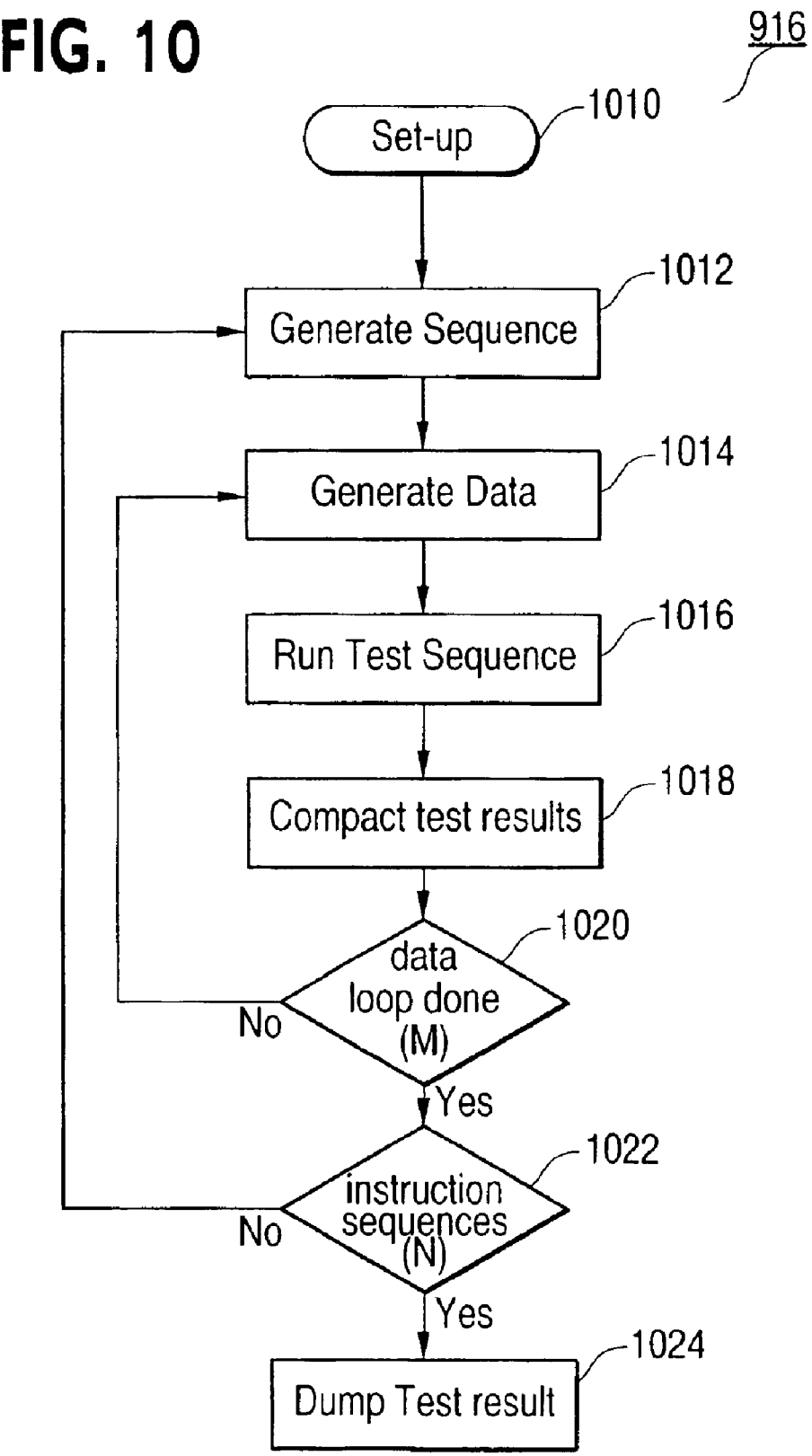
FIG. 10 illustrates a flow diagram of an example flow diagram of a functional random instruction test (FRIT) execution sequence according to an embodiment of the present invention.

FIG. 10 illustrates a flow diagram of an example functional random instruction test (FRIT) execution sequence according to an embodiment of the present invention. As shown in FIG. 10, after the kernel test patterns (SBE "420A") are applied to the complex device such as a microprocessor under test (DUT) 430 from the on-board memory 434, the microprocessor 430 may begin basic set-up at block 1010. The kernel test patterns (SBE "420A") are then executed by the microprocessor 430 to generate a test sequence at block 1012. Associated data for the test sequence may also be generated by the kernel test patterns (SBE "320A") at block 1014. Once the test sequence and the associated data are generated, the microprocessor 430 may now run (execute) the test sequence at block 1016. At the end of the test sequence, the test results may be obtained and compressed by way of the test result compaction module 530 of the kernel test patterns (SBE "420A") as shown in FIG. 5, for subsequently storage in the on-board memory 434 at block 1018.

Referring now back to FIGS. 4–5, the SBE 420A of each FRIT kernel 420 may be programmed to generate one or more ("N") loops of test sequences, where N represents an integer no less than "1" and is a user-specified number used in generating the FRIT kernel 420 by an especially designed SBE generation tool 600 shown in FIG. 6. Each of these N test sequences may in turn employ one or more (M) different data sets. Therefore, if N is ten (10) and M is five (5) for example, then there may be ten (10) distinct instruction sequences executed, each being executed five (5) times on five (5) distinct data sets, and the test results of respective loops may be obtained, compressed and written back to the on-board memory 434. In addition, a signature may be generated to provide a unique identification of the test result of each test sequence and to indicate whether the test result of a particular test sequence is "good" or "bad". The resulting "signature" may then be stored in the on-board memory 434. The signatures of all (N times M) loops may make up the expected test result (expected response) of the complex device under test (DUT) 430.

After the test result of a particular test sequence is obtained and compressed for compaction, the microprocessor 430 may determine if all data sets (M) associated with a test sequence of a particular loop are completed or done at block 1020. If all data sets associated with a test sequence of a particular loop are not completed or done, the microprocessor 430 may return to generate associated data at block 1014 and continue to run the test sequence at block 1016 until the test result is obtained and compressed at block

1018. However, if the data sets associated with a test sequence are completed or done, the microprocessor 430 may determine if all ("N") instruction sequences are completed or done at block 1022. If all instruction sequences (N) are not completed or done, the microprocessor 430 may return to generate a new test sequence at block 1012, associated data of the new test sequence at block 1014 and continue to run the test sequence at block 1016 until the test result of the new test sequence is obtained and compressed at block 1018. When all the N instruction loops and M data sets have been executed, i.e., N times M number of instruction sequences have been executed, the microprocessor 430 may dump the test results of the FRIT kernel 420 from the on-board memory 434 of the microprocessor 430 back to the low cost tester 410, via low pin interface 432.

Figure 11:
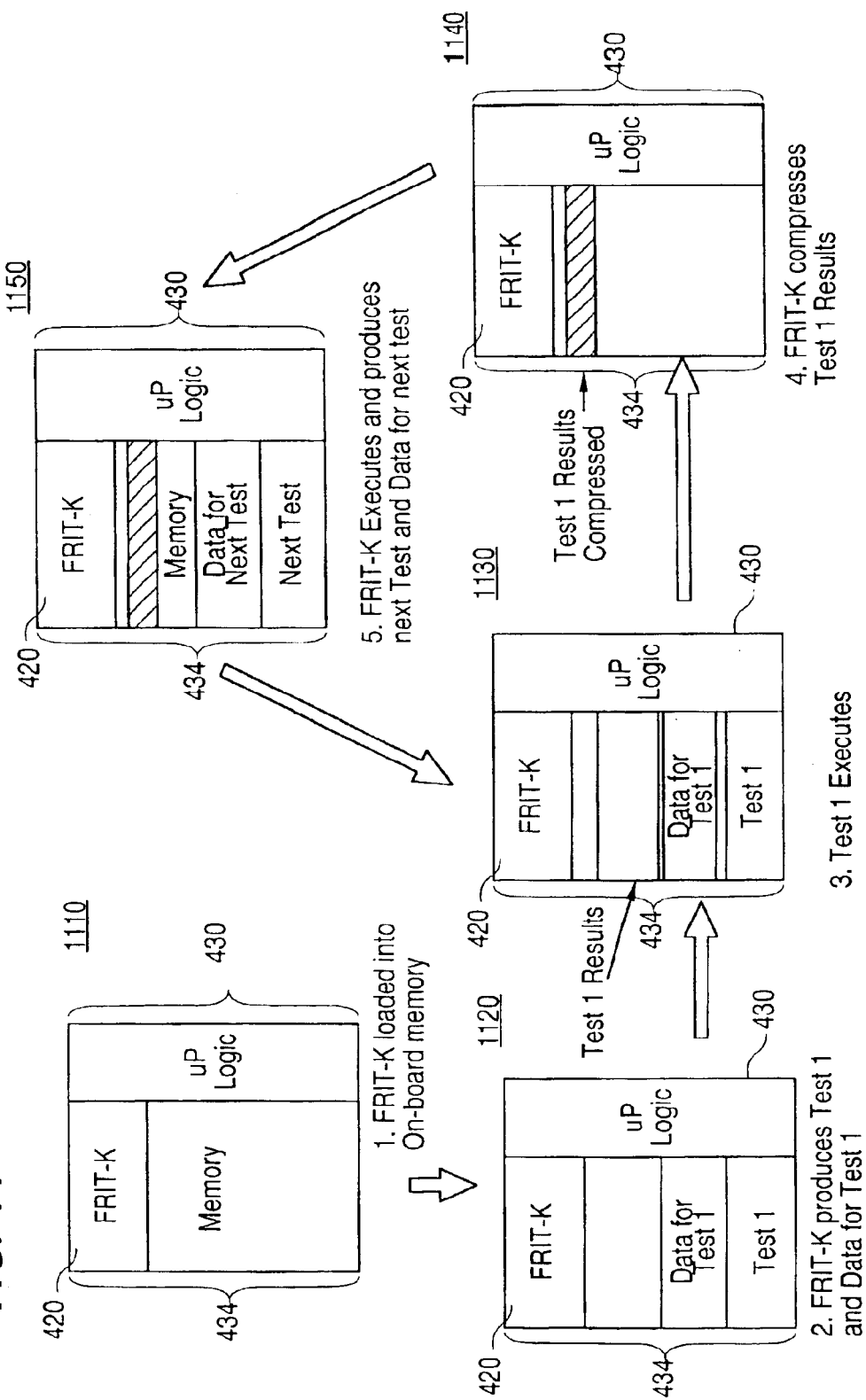
FIG. 11 illustrates a block diagram of an example functional random instruction test (FRIT) sequence execution according to an embodiment of the present invention.

FIG. 11 illustrates a block diagram of an example functional random instruction test (FRIT) execution sequence shown in FIG. 10. For simplicity, the data loops are not show in FIG. 11. Only instruction sequences are shown but are not limited thereto. FIG. 11 shows the case when M is one "1". At block 1110, the FRIT kernel 420 is loaded into the on-board memory 434 of a complex device such as microprocessor under test (DUT) 430. At block 1120, the FRIT kernel 420 may be executed by the microprocessor 430 to produce test sequence #1 and associated data for test sequence #1. At block 1130, the test sequence #1 may be executed by the microprocessor 430 to produce a test result #1, after the test sequence #1 and associated data for test sequence #1 are produced. At block 1140, the test result #1 may be compressed for compaction and may then be written into the on-board memory 434. At block 1150, the FRIT kernel 420 may be continued executed by the microprocessor 430 to produce a next test sequence, test sequence #2 for example, and associated data for test sequence #2 for test execution and subsequent test result compression until all test sequences are completed. The test results may then be dumped out after several data loops of test generation/execution by the microprocessor 430 and transferred back to the tester memory 314 for comparison with the expected test result (expected response) 420B stored therein to check for manufacturing defects.

Figure 12:
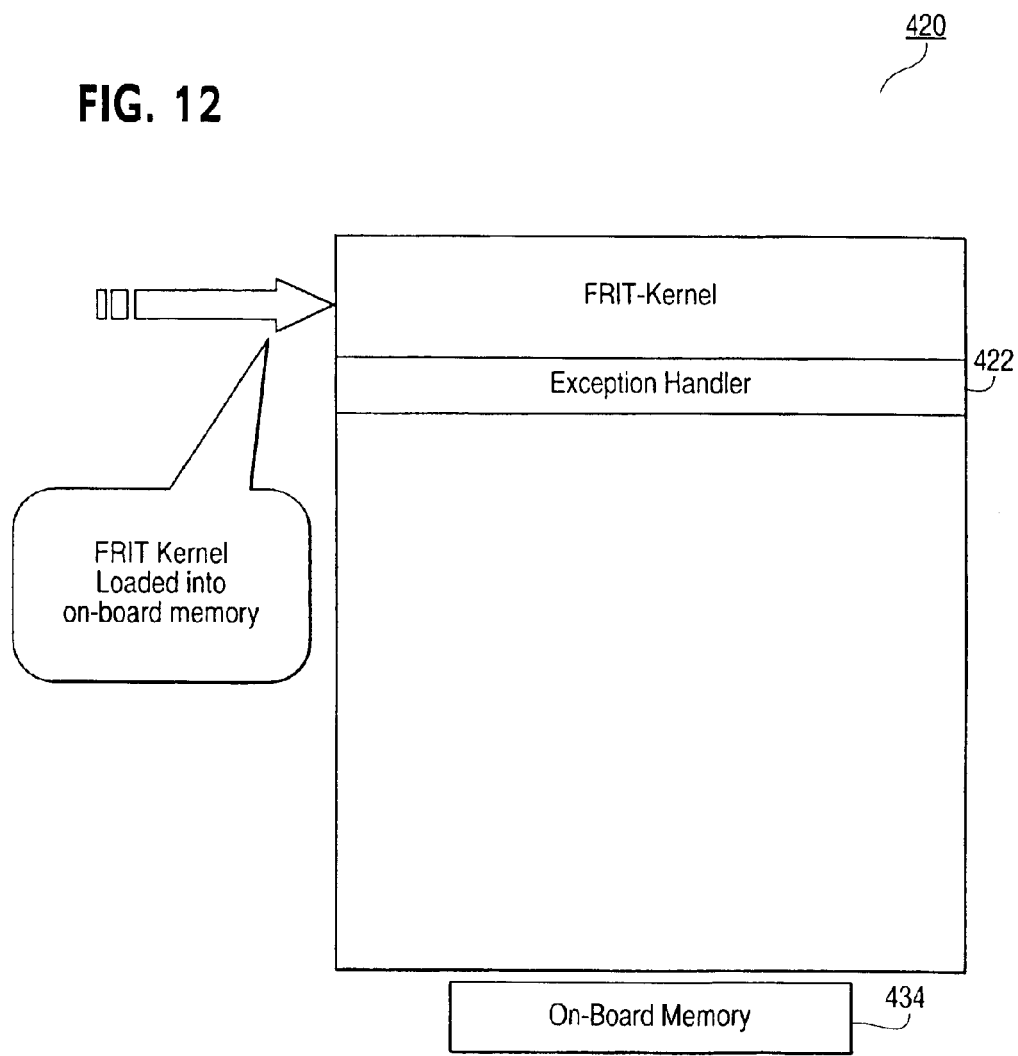
FIG. 12 illustrates an example memory image of a complex device such as a microprocessor under test (DUT) at the beginning of test according to an embodiment of the present invention.
Figure 13:
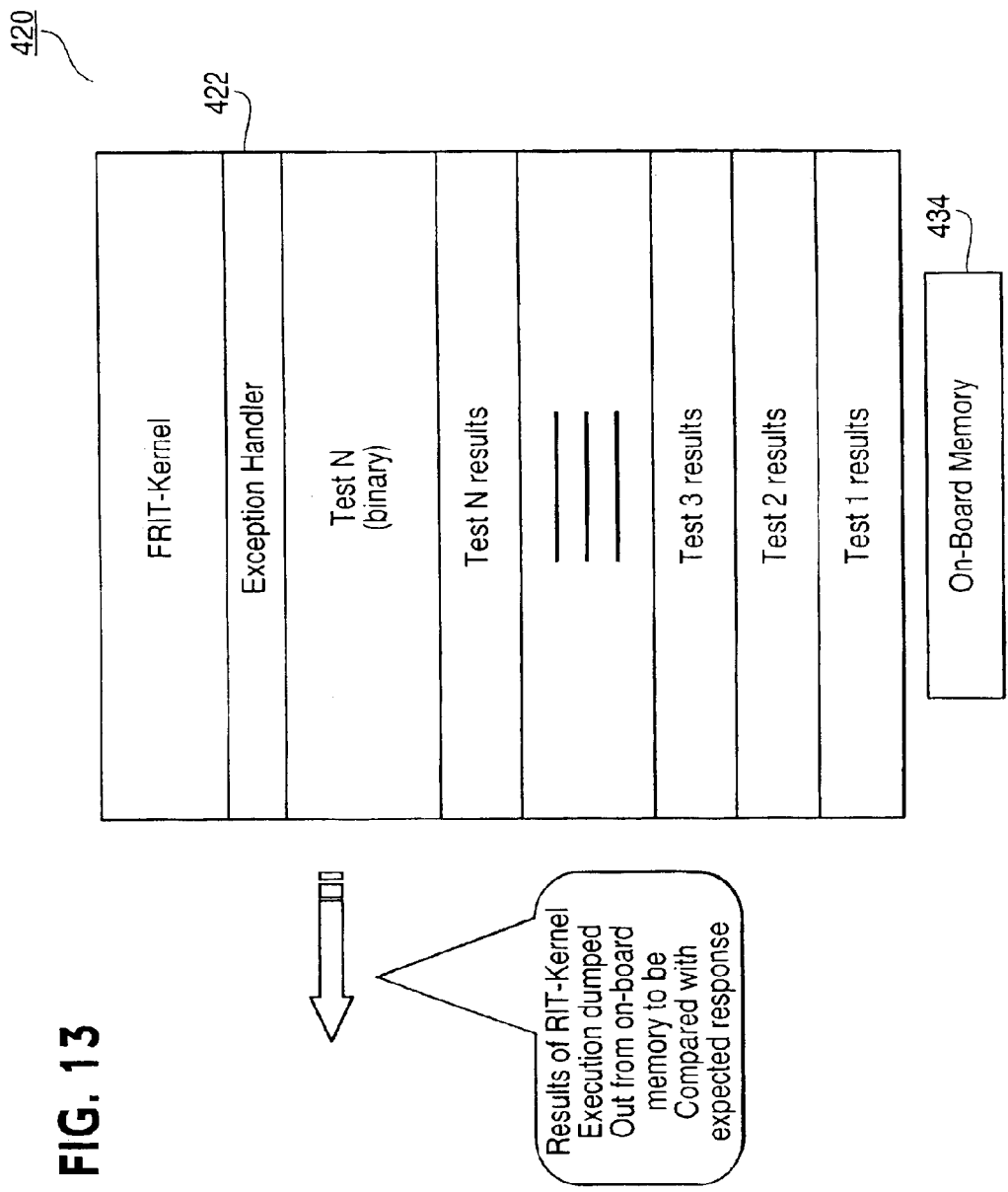
FIG. 13 illustrates an example memory image of a complex device such as a microprocessor under test (DUT) at the end of test according to an embodiment of the present invention.

FIGS. 12–13 illustrate an example memory image of a complex device such as a microprocessor under test (DUT) 430 at the beginning and at the end of a test according to an embodiment of the present invention. As shown in FIG. 12, the FRIT kernel test patterns 420 may be loaded into the on-board memory 434 using, for example, a test access port (TAP) controller (not shown). The FRIT kernel 420 may also contain an exception handler 422 configured to handle illegal conditions during test (i.e., execution of the FRIT kernel 420).

As shown in FIG. 13, at the end of the test (i.e., execution of the FRIT kernel 420), all the test results of the complex device under test (DUT) 430 stored in the on-board memory 334 may be dumped out from the on-board memory 434 to the controller 412 of the tester 410 where the test results are compared with the expected test result (expected response) 420B stored in the tester memory 414 in order to check for manufacturing defects.

As described from the foregoing, the SBE generation tool according to an embodiment of the present invention advantageously generates a testing component, SBE 420A of the FRIT kernel 420 for on-chip generation and application of functional tests. The FRIT kernel 420 then enables automated test generation in real time that is functional test based at speed and inexpensive to implement in silicon, and can be applied on low cost structural testers in order to achieve high collateral coverage while avoiding delay defect screening issues. The FRIT kernel 420 also allows a large number of tests to be applied without corresponding increase in test vector, that is, the increase in test data volume that exist with traditional RIT tools. The FRIT method offers tremendous benefits in containing the cost and ensuring quality of the microprocessors that are produced with practically no design changes and no silicon overhead. In addition, the FRIT kernel can be used at any test phase (SORT, Burn-In, Class) to reduce test data volume on the tester.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the testing system as shown in FIGS. 1 and 4 may be configured differently or employ some or different components than those illustrated without changing the basic function of the invention. The SBE generation tool and the SBE generation tool implementation may be configured differently without changing the basic function of generating a SBE. In addition, the flow diagrams shown in FIGS. 9–13 may also be described differently without changing the basic function of the invention. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A system, comprising:

user directives provided to indicate user desired actions;

instruction information provided to define a suite of instructions; and a software built-in self-test engine (SBE) generation tool arranged to generate a software built-in self-test engine (SBE) based on the user directives, the instruction information and device constraints, for subsequent storage on-board of a complex device under test (DUT) and activation of a re-generative functional test on the complex device under test (DUT);

wherein said SBE generation tool comprises:

a random instruction test generator (RIT-G) composer to receive the user directives and the instruction information and generate a compact RIT-G code;

a test execution directive composer to receive the user directives and the device constraints and create a run time environment to enable the re-generative functional test to repeatedly generate functional tests and execute generated tests on-board the complex device under test (DUT);

a test result compaction module composer to generate a test result compaction module code; and a code merger to merge code from the RIT-G composer, the test execution directive composer and the test result compaction module composer to generate the software built-in self-test engine (SBE).

2. The system as claimed in claim 1, wherein said SHE generation tool is a software tool installed to generate the software built-in self-test engine (SBE), and wherein individual components of said SBE generation tool, including the random instruction test generator (RIT-G) composer, the test execution directive composer, the test result compaction module composer, and the code merger, are software modules written in any computer language.

3. The system as claimed in claim 2, wherein said SBE generation tool is provided on a computer readable medium.

4. The system as claimed in claimed in claim 1, wherein said SHE generation tool is a hardware implementation installed to generate the software built-in self-test engine (SBE).

5. The system as claimed in claim 1, wherein said run time environment includes a test execution environment including an exception handler to handle illegal conditions such as undesirable memory accesses, deadlock, shut-down, and infinite loops, and a random instruction test (RIT) environment to provide equivalent operating system (OS) functions needed by an RIT-G to generate the re-generative functional test.

6. The system as claimed in claim 1, wherein said compact RIT-G code produced is a C-language program compiled by a C-compiler to produce an assembly language version of the RJT-G code, and when the run time environment, the test result compaction module code and the assembly language version of the RJT-G code are assembled by an assembler, a single program indicating the SBE in the target DUT's object code is obtained.

7. The system as claimed in claim 6, wherein said compact RIT-G code includes an instruction generation module to generate individual instructions during testing application.

8. A system, comprising:
user directives provided to indicate user desired actions;
instruction information provided to define a suite of instructions; and
a software built-in self-test engine (SBE) generation tool arranged to generate a software built-in self-test engine (SBE) based on the user directives, the instruction information and device constraints, for subsequent storage on-board of a complex device under test (DUT) and activation of a re-generative functional test on the complex device under test (DUT);
wherein said SBE is to be merged with an expected test result and then loaded on-board the complex device under test (DUT) so as to activate the re-generative functional test on the complex device under test (DUT) and make a comparison between test results of the re-generative functional test and the expected test result to check for design validations and/or manufacturing defects.

9. The system as claimed in claim 8, wherein said expected test result is obtained from computer modeling of the complex device under test (DUT) or from a known good device.

10. A system, comprising:
user directives provided to indicate user desired actions;
instruction information provided to define a suite of instructions; and
a software built-in self-test engine (SBE) generation tool arranged to generate a software built-in self-test engine (SBE) based on the user directives, the instruction information and device constraints, for subsequent storage on-board of a complex device under test (DUT) and activation of a re-generative functional test on the complex device under test (DUT);
wherein said software built-in self-test engine (SBE) comprises:
a random instruction test generator (RIT-G) including random instruction test (RIT) machine code residing on-board the complex device under test (DUT) for generating the re-generated functional test;
a test program execution module including test execution directives for providing a run time environment to store and run the re-generated functional test; and
a test result compaction module including compression machine code to compress test results of the re-generated functional test for storage on-board the complex device under test (DUT).

11. The system as claimed in claim 10, wherein a test execution environment employs an exception handler to handle illegal conditions, including undesirable memory accesses, deadlock, shut-down, and infinite loops.

12. A system, comprising:
user directives provided to indicate user desired actions;
instruction information provided to define a suite of instructions; and
a software built-in self-test engine (SBE) generation tool arranged to generate a software built-in self-test engine (SBE) based on the user directives, the instruction information and device constraints, for subsequent storage on-board of a complex device under test (DUT) and activation of a re-generative functional test on the complex device under test (DUT);
wherein said complex device under test (DUT) includes a microprocessor;
wherein, when test patterns of the SBE are applied to the microprocessor from an on-board memory, the microprocessor performs the following:
beginning a set-up for executing test patterns;
executing the test patterns to generate a series of test sequences and associated data for respective test sequences;
running the test sequences, and at the end of the test sequences, obtaining test results for storage in the on-board memory; and
dumping the test results of the test patterns for making a comparison with an expected test result to check for design validations and/or manufacturing defects; and
wherein said software built-in self-test engine (SBE) is programmed to generate and execute one or more ("N"),instruction sequences, each sequence being executed on one or more ("M") data sets, where "N" and "M" represent an integer no less than "1" and are user-specified numbers used in generating the SBE by the SBE generation tool.

13. The system as claimed in claim 12, wherein said software built-in self-test engine (SBE) is further programmed to generate one or more signatures to provide a unique identification of the test result of each test sequence and indicate whether the test result of a particular test sequence is "good" or "bad".

14. A computer readable medium having stored thereon a software built-in self-test engine (SBE) generation software tool which, when executed by a host system, causes the system to perform:
demanding inputs of user directives indicating user desired actions;
obtaining instruction information provided to define a suite of instructions; and
generating a software built-in self-test engine (SBE) based on the user directives, the instruction information and device constraints, for subsequent storage on-board of a complex device under test (DUT) and activation of a re-generative functional test on the complex device under test (DUT);

wherein said SBE generation tool comprises:
- a random instruction test generator (RIT-G) composer to receive the user directives and the instruction information and generate a compact RIT-G code;
- a test execution directive composer to receive the user directives and the device constraints and create a run time environment needed to enable the re-generative functional test to repeatedly generate functional tests and execute generated tests on-board the complex device under test (DUT);
- a test result compaction module composer to generate a test result compaction module code; and
- a code merger to merge code from the RIT-G composer, the test execution directive composer and the test result compaction module composer to generate the software built-in self-test engine (SBE).

15. The computer readable medium as claimed in claim 14, wherein said SBE is to be merged with an expected test result and then loaded on-board the complex device under test (DUT) so as to activate the re-generative functional test on the complex device under test (DUT) and make a comparison between test results of the re-generative functional test and the expected test result to check for design validations and/or manufacturing defects.

16. The computer readable medium as claimed in claim 15, wherein said expected test result is obtained from computer modeling of the complex device under test (DUT) or from a known good device.

17. The computer readable medium as claimed in claim 14, wherein said run time environment includes a test execution environment including an exception handler to handle illegal conditions such as undesirable memory accesses deadlock, shut-down, and infinite loops, and a random instruction test (RIT) enviroment to provide equivalent operating system (OS) functions needed by an RIT-G to generate the re-generative functional test.

18. The computer readable medium as claimed in claim 14, wherein said compact RIT-G code produced is a C-language program compiled by a C-compiler to produce an assembly language version of the RIT-G code, and when the run time environment, the test result compaction module code and the assembly language version df the RIT-G code are assembled by an assembler, a single program indicating the SBE in the target DUT's object code is obtained.

19. The computer readable medium as claimed in claim 14, wherein said compact RIT-G code includes an instruction generation module to generate individual instructions during testing application.

20. A computer readable medium having stored thereon a software built-in self-test engine (SBE) generation software tool which, when executed by a host system, causes the system to perform:
- demanding inputs of user directives indicating user desired actions;
- obtaining instruction information provided to define a suite of instructions; and
- generating a software built-in self-test engine (SBE) based on the user directives, the instruction information and device constraints, for subsequent storage on-board of a complex device under test (DUT) and activation of a re-generative functional test on the complex device under test (DUT);
- wherein said software built-in self-test engine (SBE) comprises:
  - a random instruction test generator (RIT-G) including compact random instruction test (RIT) machine code residing on-board the complex device under test (DUT) for generating the re-generated functional test;
  - a test program execution module including test execution directives for providing a run time environment to store and run the re-generated functional test; and
  - a test result compaction module including compression machine code to compress test results of the re-generated functional test for storage on-board the complex device under test (DUT).

21. A computer readable medium having stored thereon a software built-in self-test engine (SBE) generation software tool which, when executed by a host system, causes the system to perform:
- demanding inputs of user directives indicating user desired actions;
- obtaining instruction information provided to define a suite of instructions; and
- generating a software built-in self-test engine (SBE) based on the user directives, the instruction information and device constraints, for subsequent storage on-board of a complex device under test (DUT) and activation of a re-generative functional test on the complex device under test (DUT);
- wherein said software built-in self-test engine (SBE) is programmed to generate and execute one or more ("N") instruction sequences during testing, each sequence being executed on one or more ("M") data sets, where "N" and "M" represent an integer no less than "1" and are user-specified numbers used in generating the SBE by the SBE generation tool.

22. The computer readable medium as claimed in claim 21, wherein said software built-in self-test engine (SBE) is further programmed to generate one or more signatures to provide a unique identification of the test result of each test sequence and indicate whether the test result of a particular test sequence is "good" or "bad".

23. A method for generating a software built-in self-test engine (SBE) for on-chip generation and application of a re-generative functional test on a complex device under test (DUT), comprising:
- obtaining user directives which indicate user desired actions;
- obtaining instruction information which defines a suite of instructions; and
- generating the software built-in self-test engine (SBE) based on the user directives, the instruction information and device constraints, for subsequent storage on-board of the complex device under test (DUT) and activation of the re-generative functional test on the complex device under test (DUT);
- wherein said software built-in self-test engine (SBE) is generated by:
  - generating a compact random instruction test generator (RIT-G) code based on the user directives and the instruction information;
  - creating a run time environment to enable the re-generative functional test to repeatedly generate functional tests and execute generated tests on-board the complex device under test (DUT) based on the device constraints;
  - generating a test result compaction module code based on the user directives and the device constraints; and
  - merging the RIT-G code, the run time environment and the test result compaction module code to obtain the software built-in self-test engine (SBE).

24. The method as claimed in claim 23, wherein said run time environment includes a test execution environment including an exception handler to handle illegal conditions such as undesirable memory accesses, deadlock, shut-down, and infinite loops, and a random instruction test (RIT) environment to provide equivalent operating system (OS) functions needed by a random instruction test generator to generate (RIT-G) the re-generative functional test.

25. The method as claimed in claim 23, wherein said compact RIT-G code produced is a C-language program compiled by a C-compiler to produce an assembly language version of the RIT-G code, and when the run time environment, the test result compaction module code and the assembly language version of the RIT-G code are assembled by an assembler, a single program indicating the SBE in the target DUT's object code is obtained.

26. The method as claimed in claim 23, wherein said complex device under test (DUT) includes a microprocessor.

27. The method as claimed in claim 23, wherein, when test patterns of the SBE are applied to a microprocessor from an on-board memory, the microprocessor performs the following:

beginning a set-up for executing test patterns; executing the test patterns to generate a series of test sequences and associated data for respective test sequences;

running the test sequences, and at the end of the test sequences, obtaining test results for storage in the on-board memory; and dumping the test results of the test patterns for making a comparison with an expected test result to check for design validations and/or manufacturing defects.

28. The method as claimed in claim 27, wherein said software built-in self-test engine (SBE) is programmed to generate and e or more ("N") instruction sequences, each sequence being executed on one or more ("M") data sets during testing, where "N" "M" represent an integer no less than "1" and are user-specified numbers used in generating the SBE.

29. The method as claimed in claim 28, wherein said software built-in self-test engine (SBE) is further programmed to generate one or more signatures to provide a unique identification of the test result of each test sequence and indicate whether the test result of a particular test sequence is "good" or "bad".

30. A method for generating a software built-in self-test engine (SBE) for on-chip generation and application of a re-generative functional test on a complex device under test (DUT), comprising:

obtaining user directives which indicate user desired actions;

obtaining instruction information which defines a suite of instructions; and generating the software built-in self-test engine (SBE) based on the user directives, the instruction information and device constraints, for subsequent storage on-board of the complex device under test (DUT) and activation of the re-generative functional test on the complex device under test (DUT);

wherein said SBE is to be merged with an expected test result and then loaded on-board the complex device under test (DUT) so as to activate the re-generative functional test on the complex device under test (DUT) and make a comparison between test results of the re-generative functional test and the expected test result to check for design validations and/or manufacturing defects.

31. The method as claimed in claim 30, wherein said expected test result is obtained from computer modeling of the complex device under test (DUT) or from a known good device.

* * * * *

UNITED STATES PATENT AND TRADEMARK OFFICE
CERTIFICATE OF CORRECTION

PATENT NO.     : 6,928,638 B2
DATED          : August 9, 2005
INVENTOR(S)    : Parvathala et al.

It is certified that error appears in the above-identified patent and that said Letters Patent is hereby corrected as shown below:

<u>Title page,</u>
Item [56], References Cited, OTHER PUBLICATIONS,
"Lee" reference, after "et al" insert -- . --.
"Bogue" reference, after "et al" insert -- . --.
"Pomeranz" reference, after "et al" insert -- . --.
"Chen" reference, after "et al" insert -- . --.
"Douglas" reference, after "et al" insert -- . --.

<u>Column 12,</u>
Line 62, delete "SHE" and insert -- SBE --, therefor.

<u>Column 13,</u>
Line 5, after "claimed in" delete "claimed in".
Line 6, delete "SHE" and insert -- SBE --, therefor.
Lines 20 and 22, delete "RJT-G" and insert -- RIT-G --, therefor.

<u>Column 14,</u>
Line 42, after "("N")" delete ",".

<u>Column 15,</u>
Line 32, delete "enviroment" and insert -- environment --, therefor.
Line 40, delete "df" and insert -- of -- therefor.

UNITED STATES PATENT AND TRADEMARK OFFICE
CERTIFICATE OF CORRECTION

PATENT NO. : 6,928,638 B2
DATED : August 9, 2005
INVENTOR(S) : Parvathala et al.

It is certified that error appears in the above-identified patent and that said Letters Patent is hereby corrected as shown below:

Column 17,
Lines 4-5, after "generator" delete "to generate".
Line 5, after "(RIT-G)" insert -- to generate --.
Line 31, delete "e" and insert -- execute one --, therefor.
Line 33, delete ""N" "M"" and insert -- "N" and "M" --, therefor.

Signed and Sealed this

Twenty-second Day of November, 2005

JON W. DUDAS
*Director of the United States Patent and Trademark Office*